(12) United States Patent
Thaemert et al.

(10) Patent No.: US 12,459,033 B2
(45) Date of Patent: Nov. 4, 2025

(54) DEVICE FOR CROSSING MULTI-STRAND FENCES

(71) Applicant: Wire-Ups, LLC, Huntsville, AL (US)

(72) Inventors: Kurt Thaemert, Boise, ID (US); Todd Haley, Falkville, AL (US)

(73) Assignee: Wire-Ups, LLC, Huntsville, AL (US)

( * ) Notice: Subject to any disclaimer, the term of this patent is extended or adjusted under 35 U.S.C. 154(b) by 324 days.

(21) Appl. No.: 18/136,434

(22) Filed: Apr. 19, 2023

(65) Prior Publication Data

US 2023/0339011 A1    Oct. 26, 2023

Related U.S. Application Data

(60) Provisional application No. 63/333,043, filed on Apr. 20, 2022.

(51) Int. Cl.
*B21F 33/00* (2006.01)

(52) U.S. Cl.
CPC .................... *B21F 33/00* (2013.01)

(58) Field of Classification Search
CPC ......... B25B 25/00; E04H 17/04; E06B 11/00; B21F 33/00
USPC .......................................................... 81/485
See application file for complete search history.

(56) References Cited

U.S. PATENT DOCUMENTS

| 543,853 | A | | 8/1895 | Davis |
|---|---|---|---|---|
| 835,956 | A | | 11/1906 | Grange |
| 1,075,769 | A | | 10/1913 | Dall |
| 2,370,358 | A | * | 2/1945 | Koch ...................... D06F 53/00 24/129 R |
| 2,392,648 | A | * | 1/1946 | Cushman ............... B65D 63/14 24/546 |
| 2,791,625 | A | | 5/1957 | Swanson |
| 2,972,007 | A | | 2/1961 | Zoeller |
| 3,411,754 | A | | 11/1968 | Fahrenholz |
| 4,150,814 | A | | 4/1979 | Warren et al. |
| 4,196,890 | A | | 4/1980 | Einhorn |
| 4,462,572 | A | | 7/1984 | Hanneken |
| 4,507,987 | A | * | 4/1985 | vonBergen ............. B25B 25/00 24/19 |
| 4,708,323 | A | | 11/1987 | Noakes |

(Continued)

OTHER PUBLICATIONS

Wire winder, Google, Oct. 20, 2023, https://www.google.com/search/about-this-image?img=H4slAAAAAAAA_wEWAOn_ChQln-b_6Omyqc0jEJrSn83NpsGCXJ1rVoQWAAAA&q= (Year: 2023).

*Primary Examiner* — Katina N. Henson
(74) *Attorney, Agent, or Firm* — Bradley Arant Boult Cummings LLP; Stephen Hall; Alex Huffstutter

(57) ABSTRACT

A device for crossing a multistrand wire fence may comprise a handle, a crossbar, a first and second side supports coupled between the handle and the crossbar, and first and second angled arms extending from each end of the crossbar away from the handled and at least partially towards each other. A fence wire receptacle may be defined between the crossbar and the first and second angled arms. In use, a user may hook the first angled arm of a first wire of the fence and pull down, allowing the user to scoop up an adjacent, or other, wire and place the second angled arm under the adjacent wire thus causing the wires to be pulled toward each other, thus increasing an ease of accessibility from one side of the fence to the other.

6 Claims, 6 Drawing Sheets

(56) References Cited

U.S. PATENT DOCUMENTS

| | | | |
|---|---|---|---|
| 4,982,932 | A | 1/1991 | Baker |
| 5,016,693 | A | 5/1991 | Haffely et al. |
| 5,664,768 | A | 9/1997 | Scabar |
| 6,044,872 | A | 4/2000 | Stephens |
| 6,050,549 | A | 4/2000 | Foy |
| 6,293,521 | B1 | 9/2001 | Parrish |
| 6,296,233 | B1 | 10/2001 | Berg et al. |
| 6,499,514 | B1 | 12/2002 | Hodge, Sr. |
| 6,583,363 | B1 | 6/2003 | Wilson, Jr. |
| 6,595,496 | B1 | 7/2003 | Langlie et al. |
| 6,802,495 | B1 | 10/2004 | Schmidt |
| 6,971,638 | B2 | 12/2005 | Burdick |
| 7,216,852 | B2 | 5/2007 | Gravelle |
| 7,637,481 | B2 | 12/2009 | Forero |
| 7,819,390 | B2 | 10/2010 | Godwin et al. |
| 8,246,013 | B2 | 8/2012 | Mauer et al. |
| D699,556 | S | 2/2014 | Hendricks |
| D706,617 | S | 6/2014 | Hendricks |
| 9,234,367 | B2 | 1/2016 | Kopp |
| 10,170,221 | B2 | 1/2019 | McKinley et al. |
| 10,323,436 | B2 | 6/2019 | White et al. |
| 10,411,367 | B2 | 9/2019 | Malins |
| 10,428,554 | B2 | 10/2019 | Johns et al. |
| 11,624,202 | B2 | 4/2023 | Hiner et al. |
| D1,002,355 | S | 10/2023 | Osuga |
| 2005/0173583 | A1 | 8/2005 | Von Seidel |
| 2007/0125597 | A1 | 6/2007 | Howerton |
| 2013/0328003 | A1 | 12/2013 | Hendricks et al. |
| 2014/0360620 | A1 | 12/2014 | Singleton |
| 2018/0371787 | A1 | 12/2018 | Hanneken |
| 2018/0371788 | A1 | 12/2018 | Durham |
| 2022/0412120 | A1 | 12/2022 | Siverwright |

\* cited by examiner

DEVICE FOR CROSSING MULTI-STRAND FENCES

CROSS-REFERENCE TO RELATED APPLICATIONS

This application claims priority to U.S. Provisional Patent Application Ser. No. 63/333,043, filed Apr. 20, 2022, and entitled "Device for Crossing Multi-Strand Fences," which is incorporated herein by reference in its entirety.

BACKGROUND

The present invention relates generally to tools, and more particularly, the present disclosure relates a device for safely crossing multi-strand fences.

Hunters, outdoorspeople, farmers, ranchers, and the like often need to cross multi-strand fences without damaging their clothing or injuring themselves or the fence. Manually holding the multi-strand fencing open while attempting to climb over or crawl under is dangerous and cumbersome.

BRIEF SUMMARY

In view of at least some of the above-referenced problems in crossing multi-strand fencing, an exemplary object of the present disclosure may be to provide a device designed to hold wires of a multi-strand fence together for creating an opening big enough for a person or gear to pass through. An exemplary such apparatus may desirably enable an individual to safely and effectively cross a multi-strand fence.

In a particular embodiment, an exemplary device for crossing a fence having multiple horizontal strands spaced apart vertically is disclosed herein. The device may comprise a handle, a crossbar, a first side support, a second side support, and first and second angled arms. The handle may have a first handle end and a second handle end. The crossbar may be spaced apart from the handle and may have a first crossbar end and a second crossbar end. The first side support may extend between the first handle end and the first crossbar end. The second side support may extend between the second handle end and the second crossbar end. The first angled arm may extend from the first crossbar end away from the handle and may be at least partially angled towards the second crossbar end. The second angled arm may extend from the second crossbar end away from the handle and may be at least partially angled towards the first crossbar end.

In another embodiment, an exemplary device for crossing a fence having multiple horizontal strands spaced apart vertically is disclosed herein. The device may comprise a handle, a pair of side supports, a crossbar, and a fence wire receptacle. The pair of side supports may extend perpendicularly from each end of the handle. The crossbar may extend between distal ends of each of the side supports. The fence wire receptacle may be defined between a pair of angled arms extending from each end of the crossbar. The pair of angled arms may be extending at an angle toward each other.

In another embodiment, an exemplary method of manipulating horizontal strands of a fence having a plurality of horizontal strands spaced apart vertically, for example, to create an enlarged opening, is provided. The method may comprise positioning at least two strands of the plurality of horizontal strands within a receptacle of a device, the receptacle defined by a crossbar and a pair of angled arms extending from each end of the crossbar and at least partially towards each other; crossing from a first side of the fence to a second side of the fence; and removing the device from the at least two strands of the plurality of horizontal strands of the fence.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
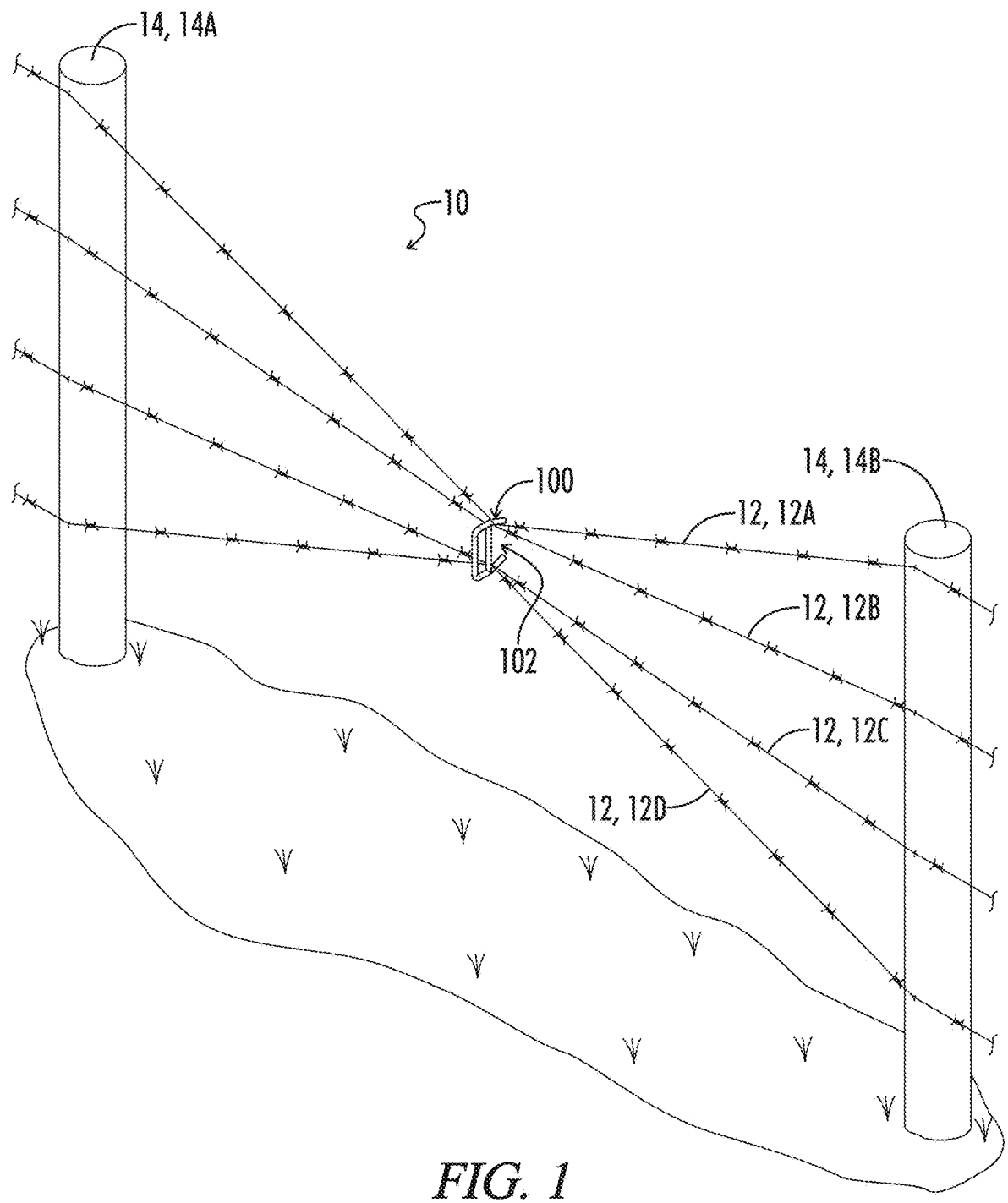
FIG. 1 is a perspective view of a device engaging strands of a multi-strand fence in accordance with the present disclosure.
Figure 2:
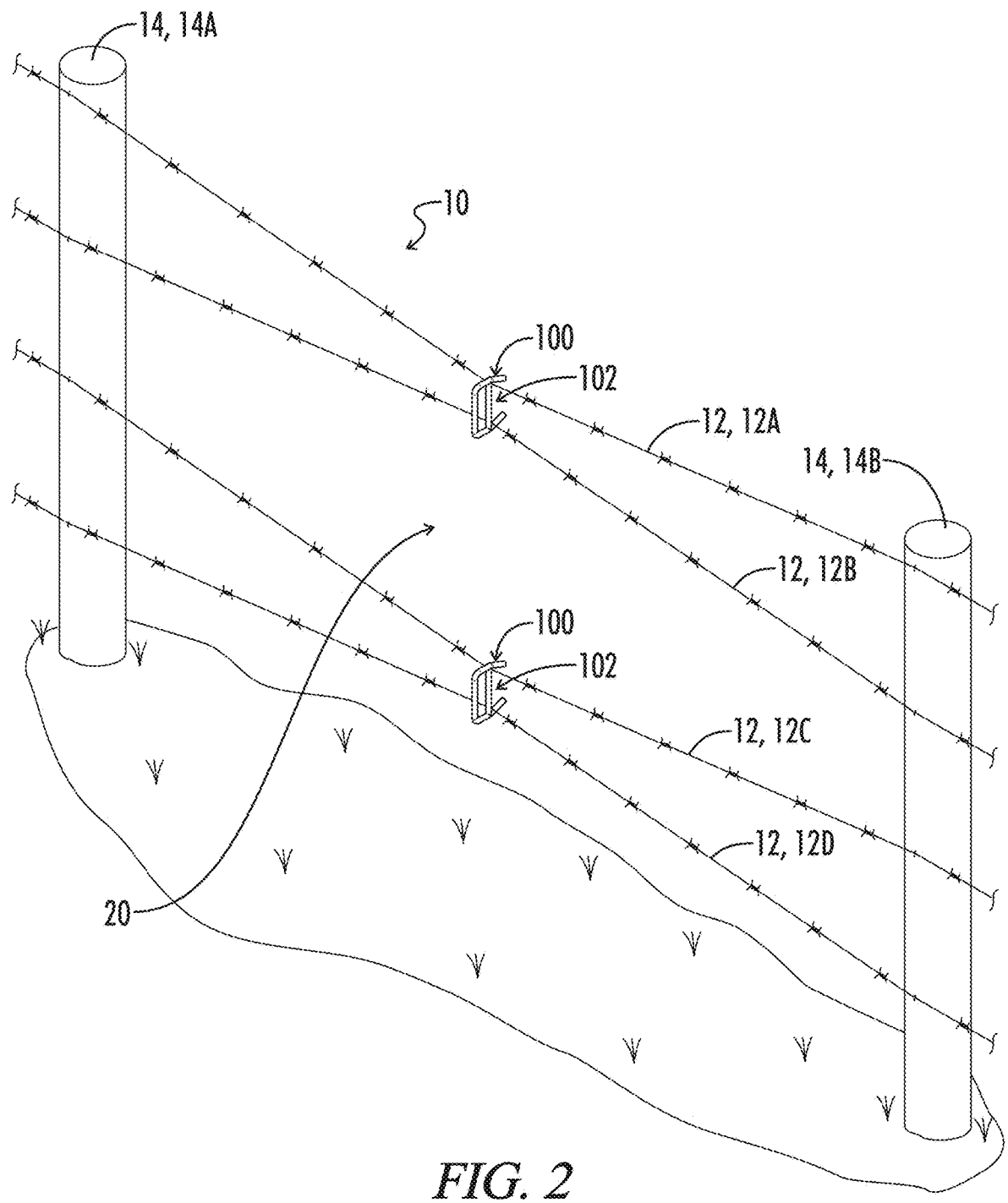
FIG. 2 is a perspective view of two of the devices of FIG. 1 engaging different pairs of strands of a multi-strand fence in accordance with the present disclosure.

Referring to FIG. 1, a barbed wire crossing device 100 is illustrated engaging stands of a fence 10 having a plurality of horizontal strands 12 (e.g., 12A, 12B, 12C, 12D). The plurality of horizontal strands 12 may be spaced apart vertically and may generally pulled tight spanning between a plurality of posts 14, two of which being shown (e.g., 14A, 14B). The plurality of horizontal strands 12 may be barbed wire, electrified wire, or any other wire or the like fencing material. The barbed wire crossing tool 100 may also be referred to herein as a device 100. Referring to FIG. 2, a spacing between the plurality of strands 12 may be manipulated using two of the devices 100 in order to create an enlarged central opening 20 for crossing or stepping through the fence 10. As illustrated in FIG. 1, an enlarged lower opening and a lowered step over may be created using a single of the device 100, such that a user may more easily crawl under or step over the fence 10.

Figure 3:
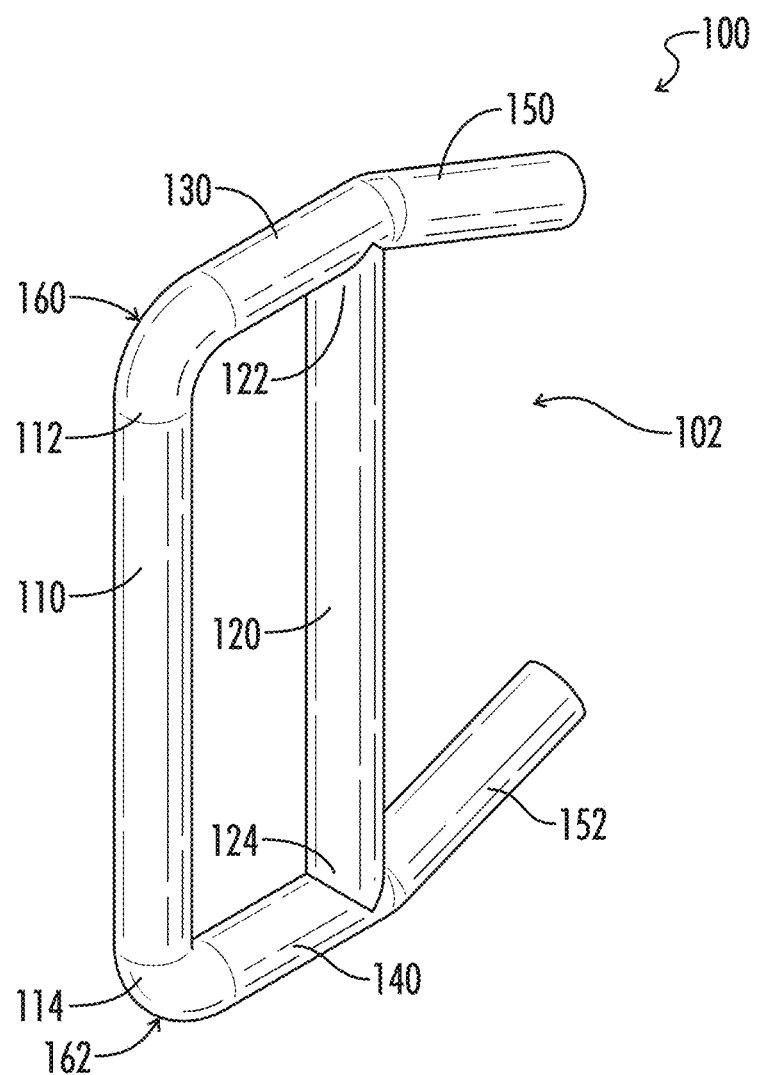
FIG. 3 is a rear perspective view of the device of FIG. 1 in accordance with the present disclosure.
Figure 4:
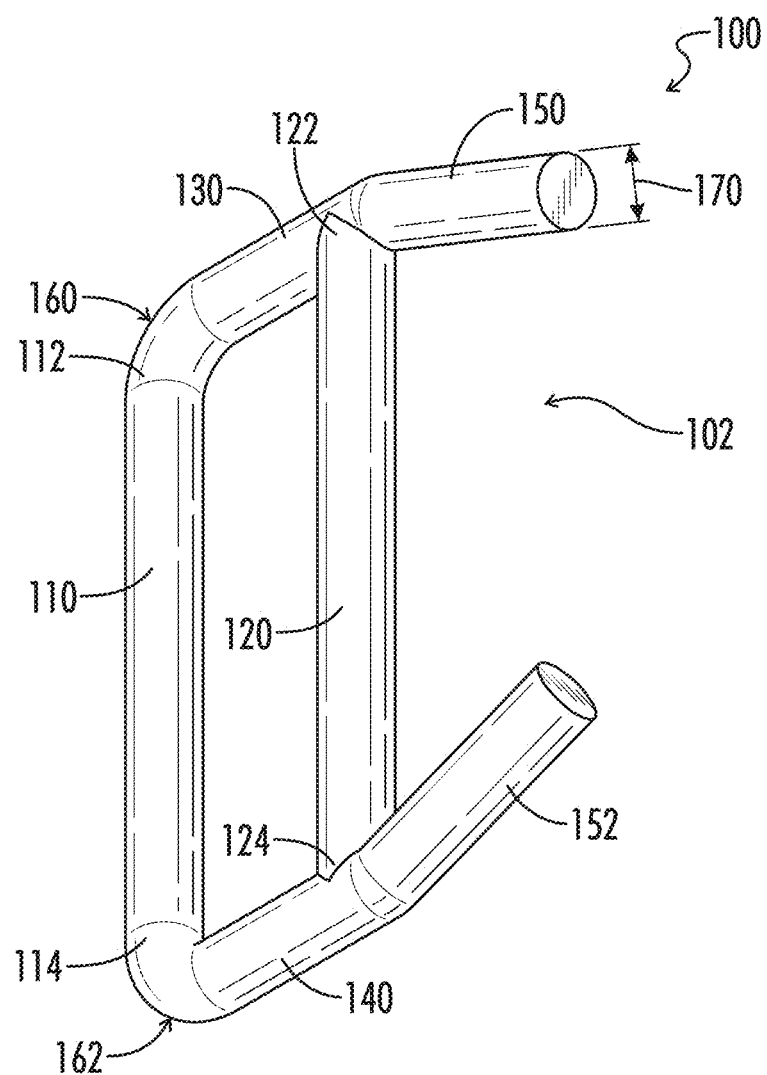
FIG. 4 is a front perspective view of the device of FIG. 1 in accordance with the present disclosure.
Figure 5:
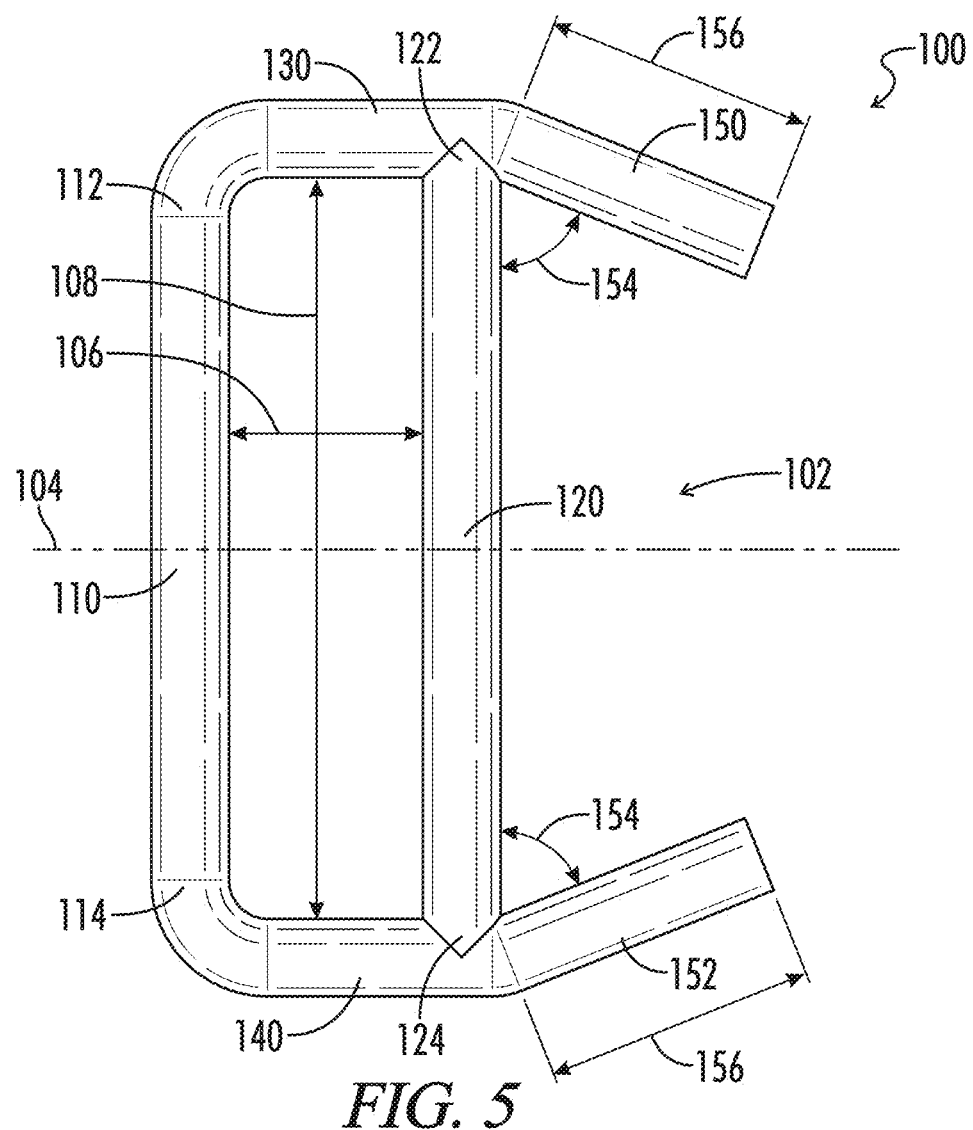
FIG. 5 is a side elevation view of the device of FIG. 1 in accordance with the present disclosure.

Referring to FIGS. 3-5, enlarged views of the device 100 are shown. The device 100 may comprise a handle 110, a crossbar 120, a first side support 130, a second side support 140, a first angled arm 150, and a second angled arm 152. The first and second sides supports 130, 140 may also be referred to herein as a pair of side supports. The first and second angled arms 150, 152 may also be referred to herein as a pair of angled side supports.

The handle 110 may include a first handle end 112 and a second handle end 114. The crossbar 120 may be spaced apart from the handle 110 and may further include a first crossbar end 122 and a second crossbar end 124. The first side support 130 may extend between the first handle end 112 and the first crossbar end 122. The second side support 140 may extend between the second handle end 114 and the second crossbar end 124. The first angled arm 150 may extend from the first crossbar end 122 away from the handle 110 and be at least partially angled towards the second crossbar end 124. The second angled arm 152 may extend from the second crossbar end 124 away from the handle 110 and be at least partially angled towards the first crossbar end 122. In other words, each of the first and second angled arms 150, 152 may be angled towards each other. In certain optional embodiments, each of the first and second angled arms 150, 152 may be acutely angled relative to the crossbar 120. In further optional embodiments, the distal ends of the first and second angled arms 150, 152 may be spaced apart.

As illustrated in FIG. 4, each of the first and second angled arms 150, 152 may extend at an angle 154 relative to the crossbar 120. In certain optional embodiments, the angle 154 of each of the first and second angled arms 150, 152 relative to the crossbar 120 may be the same. In other optional embodiments, the angle 154 of each of the first and second angled arms 150, 152 relative to the crossbar 120 may be different. In certain optional embodiments, the angle 154 may be between about thirty (30) degrees and about eighty (80) degrees. In other optional embodiments, the angle 154 may be between about sixty-five (65) degrees and about seventy-five (75) degrees. In further optional embodiments, the angle 154 may be seventy-two (72) degrees.

The first and second angled arms 150, 152 in combination with the crossbar 120 defines a receptacle 102 configured to receive at least two of the plurality of strands 12 for manipulating said strands (e.g., repositioning, flexing, etc.). The receptacle 102 may also be referred to herein as a concave receptacle, a receiver, a receiver cavity, or a wire catch area. In use, the angling of the first and second angled arms 150, 152 ensures that the strands stay within the receptacle 102. In certain optional embodiments, as illustrated in FIG. 2, two of the devices 100 may each engage two of the plurality of strands 12, for example, a top two strands 12A, 12B and a bottom two strands 12C, 12D, in order to create a larger opening 20 for stepping therethrough. In other optional embodiments, as illustrated in FIG. 1, a single of the device 100 may be deployed and engage a combination of the plurality of strands 12, for example, an uppermost strand 12A, a lowermost strand 12D, and optionally all other strands positioned therebetween in order to create a larger lower opening for crawling under the fence 10 and well as lower the uppermost strand for stepping over the fence 10.

As illustrated, the first and second side supports 130, 140 may extend perpendicularly from the handle 110. In other optional embodiments, at least one of the first and second side supports 130, 140 may extend at an angle other than perpendicularly from the handle 110. As illustrated, the first and second side supports 130, 140 may be positioned perpendicular to the crossbar 120. In further optional embodiments, at least one of the first and second side supports 130, 140 may extend at an angle other than perpendicularly from the crossbar 120.

As illustrated, the first side support 130 may be parallel to the second side support 140. In other optional embodiments, the first and second side supports 130, 140 may be angled relative to each other. Further, as illustrated, the handle 110 may be oriented parallel to the crossbar 120. In other optional embodiments, the handle 110 may be angled relative to the crossbar 120.

In certain optional embodiments, a length 156 of each of the first and second angled arms 150, 152 may be greater than a distance 106 (shown in FIG. 5) between the handle 110 and the crossbar 120. In other optional embodiments, the length 156 of each of the first and second angled arms 150, 152 may be less than or equal to the distance 106 between the handle 110 and the crossbar 120.

In certain optional embodiments, the length 156 of each of the first and second angled arms 150, 152 may be greater than one-third (⅓) of a distance 108 (shown in FIG. 5) between the first and second side supports 130, 140 and less than one-half (½) of the distance 108 between the first and second side supports 130, 140. In other optional embodiments, the length 156 of each of the first and second angled arms 150, 152 may be less than or equal to one-third (⅓) of a distance 108 between the first and second side supports 130, 140, or greater than or equal to one-half (½) of the distance 108 between the first and second side supports 130, 140.

In certain optional embodiments, the device 100 may further include a first chamfered corner 160 defined between the first handle end 112 of the handle 110 and the first side support 130, and a second chamfered corner 162 defined between the second handle end 114 of the handle 110 and the second side support 140.

In certain optional embodiments, at least a portion of the handle 110 may be textured for aiding a user in gripping the handle 110. In other optional embodiments, the textured portion may extend along a majority of the length of the handle 110. In further optional embodiments, this portion may be coated with a non-conductive material so as to protect a using from being electrocuted if one or more strand of the plurality of strands 12 is electrified.

In certain optional embodiments, the device 100 may exhibit symmetry (e.g., bilateral or reflective symmetry) about an imaginary division line 104 (shown in FIG. 5), illustrated as a dashed line centrally dividing the handle 110 and the crossbar 120.

In certain optional embodiments, each of the handle 110, the crossbar 120, the first side support 130, the second side support 140, the first angled arm 150, and the second angled arm 152 may be cylindrical. In other optional embodiments, at least one of the handle 110, the crossbar 120, the first side support 130, the second side support 140, the first angled arm 150, and the second angled arm 152 may have a different cross-sectional shape, such as, for example, hexagonal, squaroid, triangular, or the like.

In certain optional embodiments, each of the handle 110, the crossbar 120, the first side support 130, the second side support 140, the first angled arm 150, and the second angled arm 152 may have a common diameter 170. In other optional embodiments, at least one of the handle 110, the crossbar 120, the first side support 130, the second side support 140, the first angled arm 150, and the second angled arm 152 may have differential diameters or cross-sectional distances, for example, when not circular.

In certain optional embodiments, each of the handle 110, the crossbar 120, the first side support 130, the second side support 140, the first angled arm 150, and the second angled arm 152 may be linear. In other optional embodiments, at least one of the handle 110, the crossbar 120, the first side support 130, the second side support 140, the first angled arm 150, and the second angled arm 152 may be non-linear.

As illustrated, each of the handle 110, the crossbar 120, the first side support 130, the second side support 140, the first angled arm 150, and the second angled arm 152 may be parallel to a geometric plane. In other optional embodiments, at least one of the handle 110, the crossbar 120, the first side support 130, the second side support 140, the first angled arm 150, and the second angled arm 152 may be angled relative to the geometric plane.

In certain optional embodiments, the handle 110, the crossbar 120, the first side support 130, the second side support 140, the first angled arm 150, and the second angled arm 152 may be integrally formed. In other optional embodiments, one of more of the handle 110, the crossbar 120, the first side support 130, the second side support 140, the first angled arm 150, and the second angled arm 152 may be connected using, for example, fasteners or the like.

The device 100 of the present disclosure may be made using any suitable material and, in some embodiments, comprises a high-strength, glass filled nylon such that the device 100 is lightweight and compact enough to be easily transported in a user's pocket. For example, as shown in the Figures, the components of the device may be substantially cylindrical, such that there are no rough edges that may injure a user or damage a wire. Similarly, while the overall shape of the device 100 may be mostly consistent, dimensions may vary depending on user preference.

In certain optional embodiments, to use the device 100 of the present disclosure, a user may hook the first angled arm 150 on top of a first wire 12A and pull down, allowing the user to scoop up another wire 12D and place the second angled arm 152 under the other wire 12D, thus causing the wires to be pulled toward each other, as illustrated in FIG. 1. Optionally, the other wires 12B, 12C may be hooked therewith.

In other optional embodiment, to use the device 100 of the present disclosure, a user may hook the first angled arm 150 on top of a first wire 12A and pull down, allowing the user to scoop up an adjacent wire 12B and place the second angled arm 152 under the adjacent wire 12B, thus causing the wires to be pulled toward each other, as illustrated in FIG. 2. In certain optional embodiments, the user may use two of the devices 100 of the present disclosure together, such that another pair of wires 12C, 12D may be connected together, creating a large passage area 20 for a user and the user's gear. Once the user has crossed the fence, the devices 100 may simply be removed from the fence 10.

Figure 6:
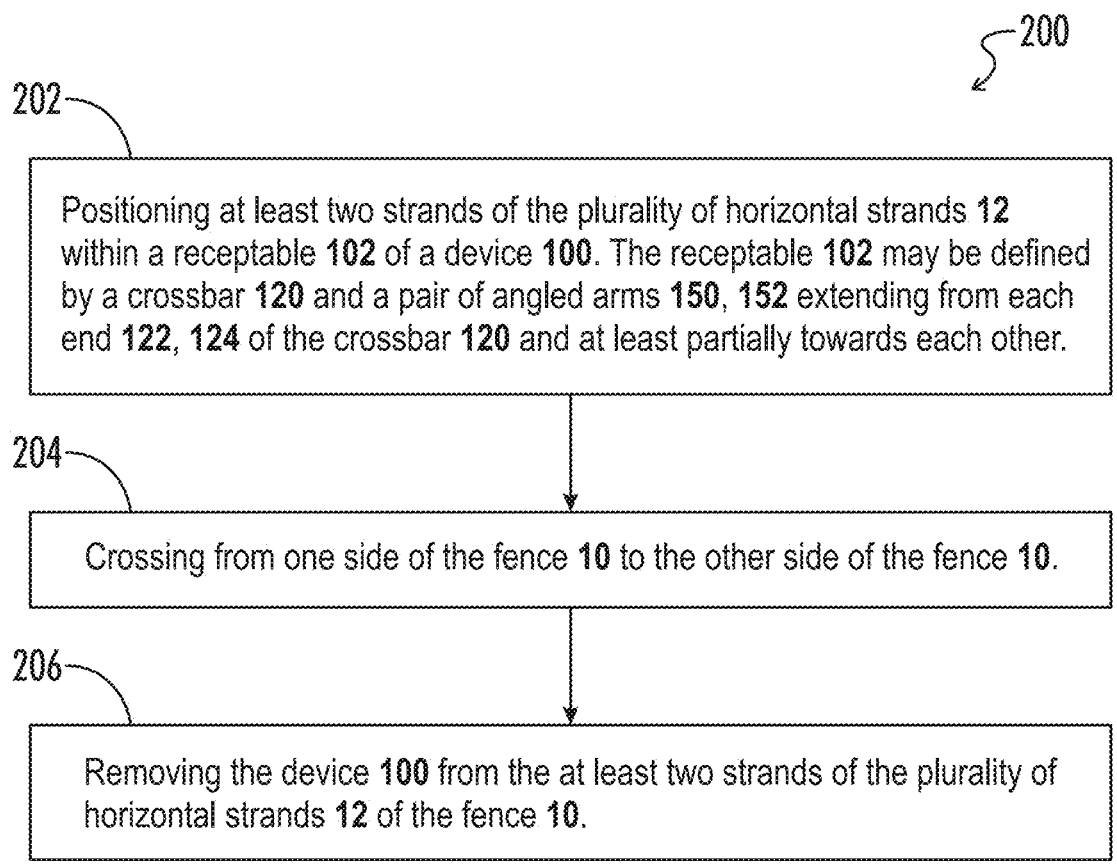
FIG. 6 is a flow diagram of a method of manipulating horizontal strands of a fence in accordance with the present disclosure.

Referring to FIG. 6, a method 200 of manipulating horizontal strands of a fence 10 having a plurality of horizontal strands 12 spaced apart vertically is shown. The method 200 may comprising positioning 202 at least two strands of the plurality of horizontal strands 12 within a receptacle 102 of a device 100. The receptacle 102 may be defined by a crossbar 120 and a pair of angled arms 150, 152 extending from each end 122, 124 of the crossbar 120 and at least partially towards each other. The method 200 may further comprise crossing 204 from one side of the fence 10 to the other side of the fence 10. The method 200 may further comprise removing 206 the device 100 from the at least two strands of the plurality of horizontal strands 12 of the fence 10.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A device for crossing a fence having a plurality of horizontal strands spaced apart vertically, the device comprising:
   a handle;
   a pair of side supports extending perpendicularly from each end of the handle;
   a crossbar extending between distal ends of each of the side supports to define a rectangular opening; and a fence wire receptacle defined between a pair of angled arms extending from each end of the crossbar away from the handle, the pair of angled arms extending at an angle toward each other.

2. The device of claim 1, wherein:
the pair of side supports are parallel to one another.

3. The device of claim 1, wherein:
the crossbar is parallel to the handle.

4. The device of claim 1, wherein:
distal ends of the pair of angled arms are spaced apart.

5. The device of claim 1, wherein:
each of the handle, the crossbar, the pair of side supports, and the pair of angled arms are parallel to a geometric plane.

6. A method of manipulating horizontal strands of a fence having a plurality of horizontal strands spaced apart vertically, the method comprising:
positioning at least two strands of the plurality of horizontal strands within a receptacle of a device, the receptacle defined by a crossbar and a pair of angled arms extending from each end of the crossbar and at least partially towards each other, wherein the crossbar is coupled to and parallel to a handle of the device using a pair of side supports to define a rectangular opening of the device;
crossing from a first side of the fence to a second side of the fence; and
removing the device from the at least two strands of the plurality of horizontal strands of the fence.

\* \* \* \* \*